Patented Aug. 14, 1945

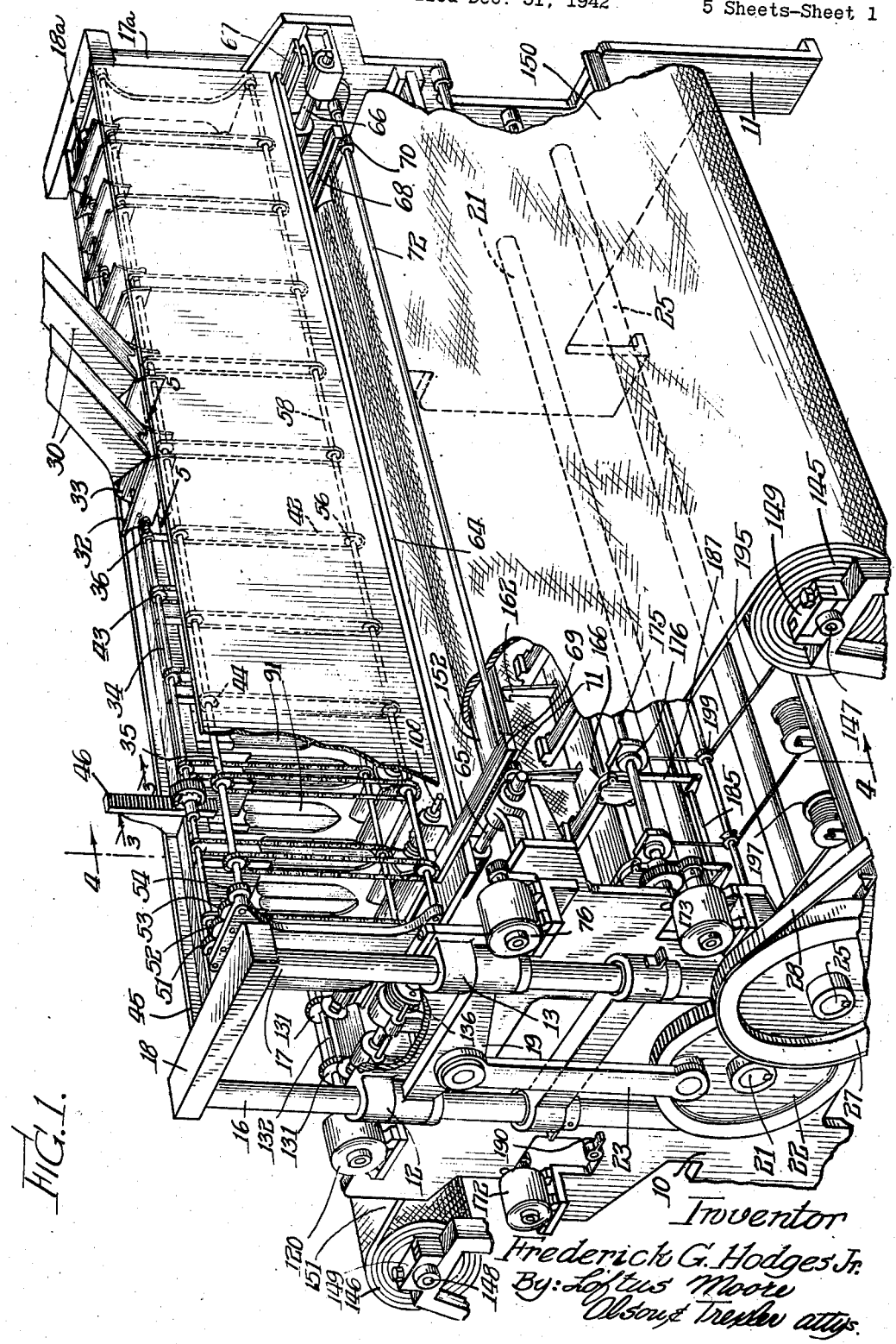

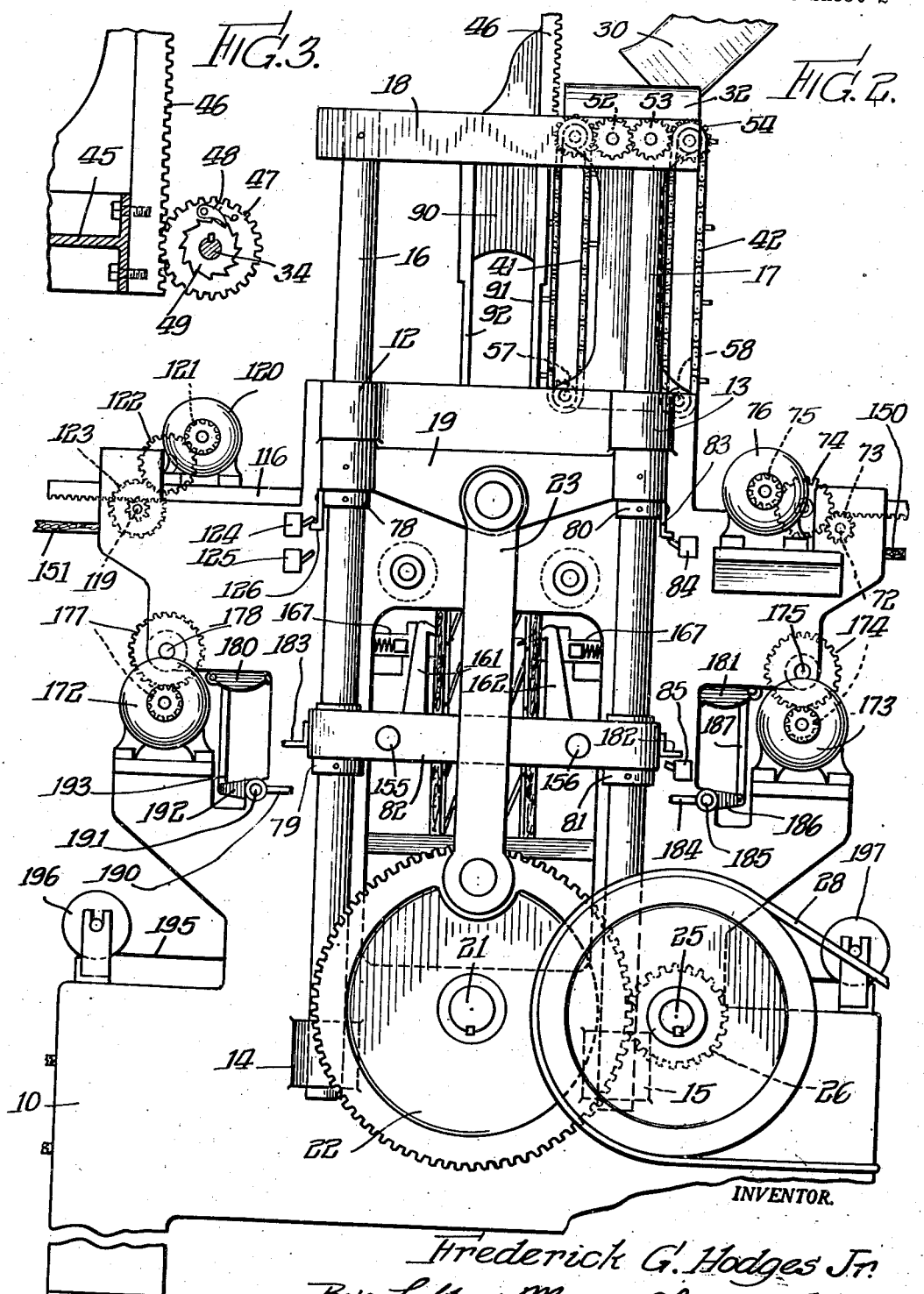

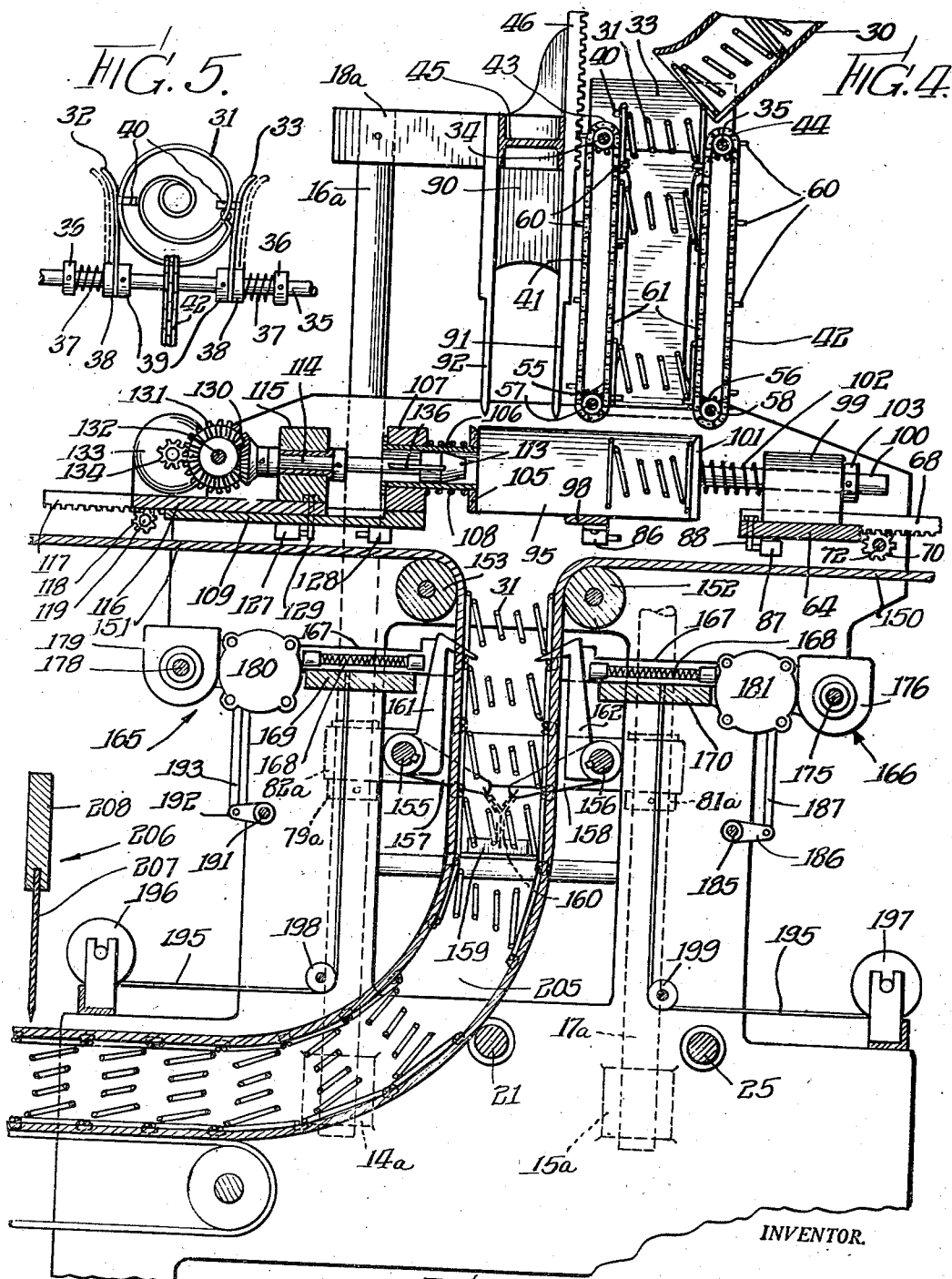

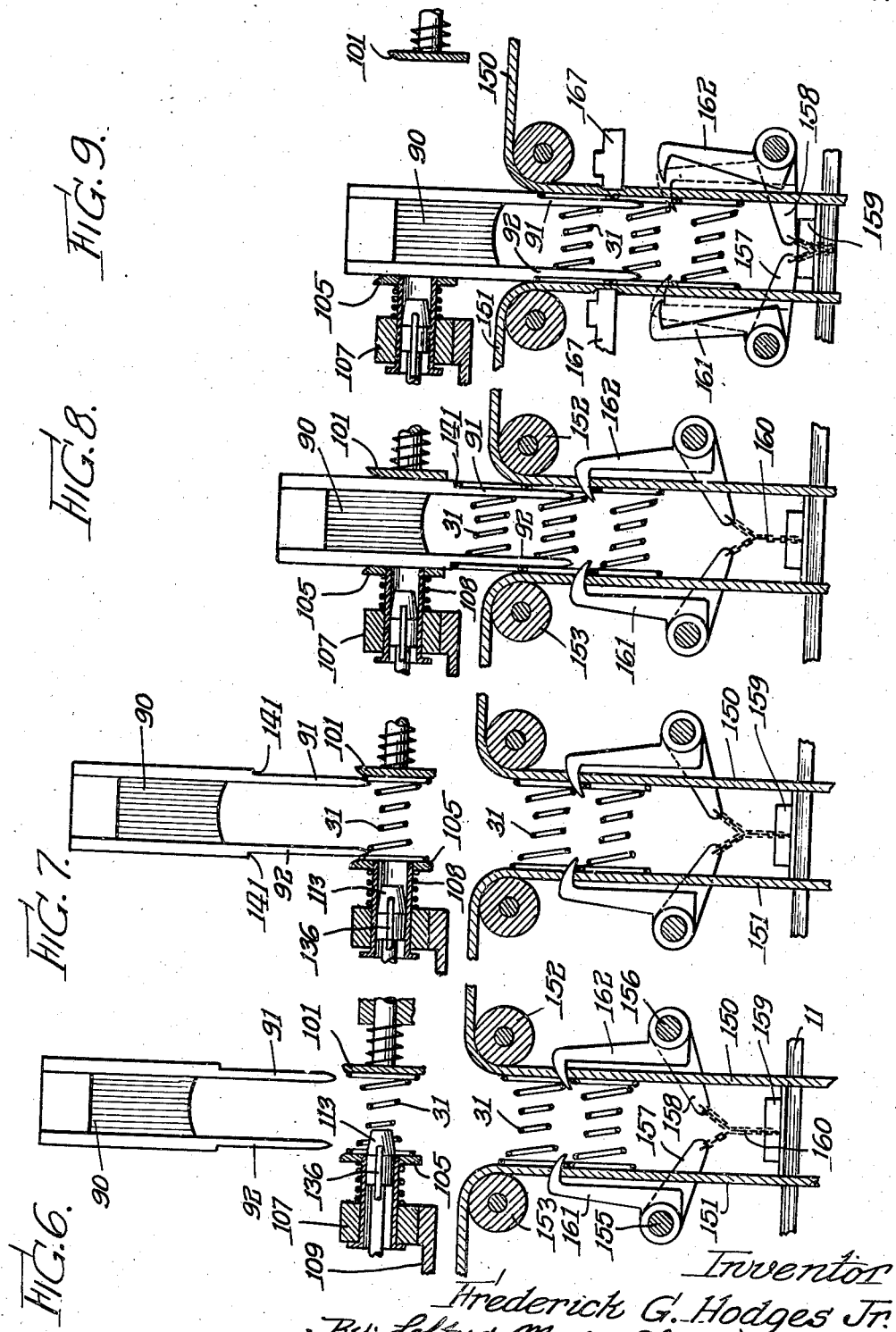

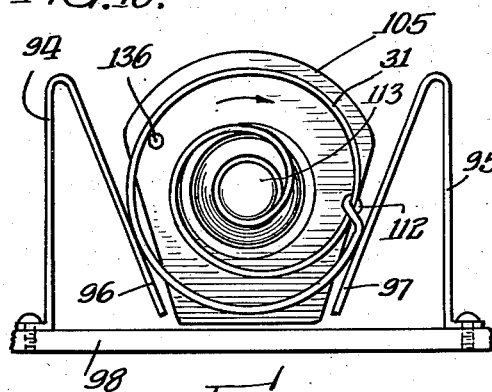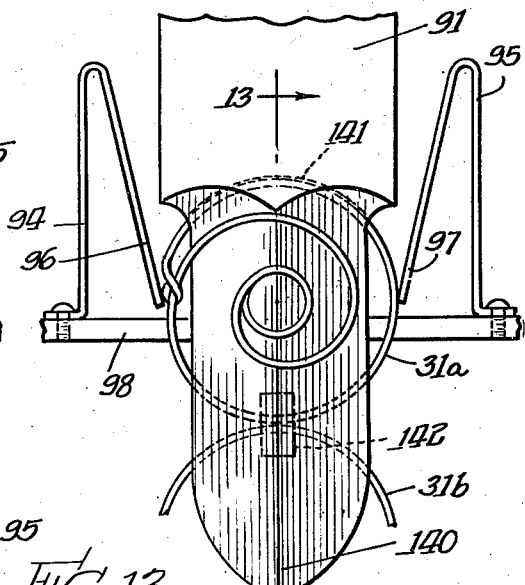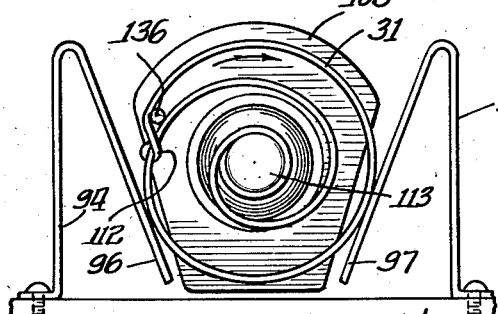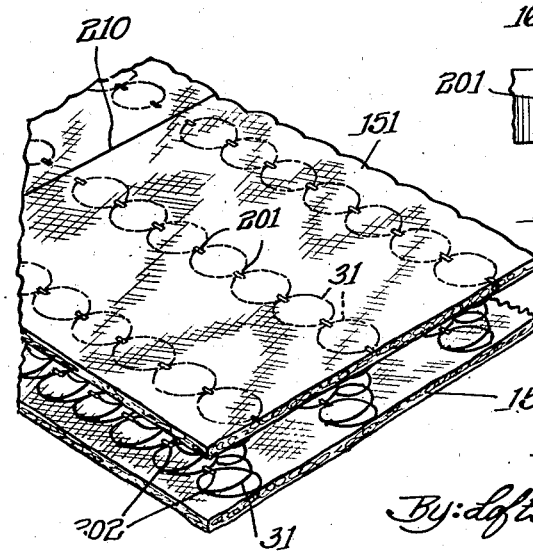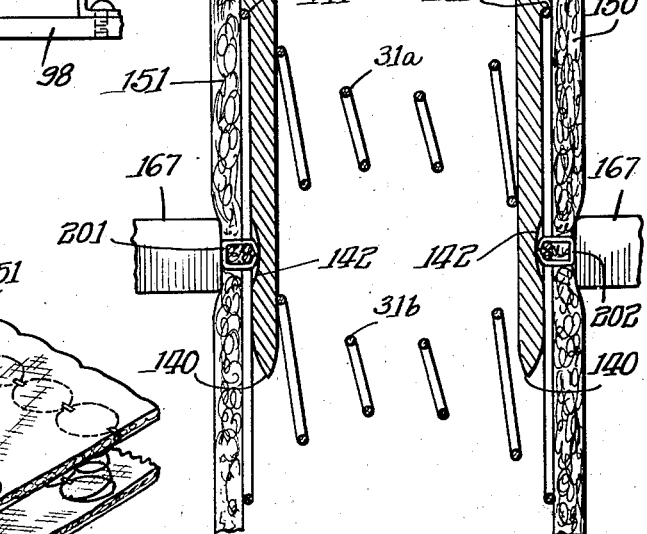

2,382,226

UNITED STATES PATENT OFFICE 2,382,226

APPARATUS FOR MAKING MATTRESSES, CUSHIONS, AND THE LIKE

Frederick G. Hodges, Jr., Washington, D. C.

Application December 31, 1942, Serial No. 470,892

23 Claims. (Cl. 45—138)

This invention relates to apparatus for making mattresses, cushions, and like spring-filled articles. The invention has particular reference to the making of the spring units for such structures.

It is an object of the invention to provide improved apparatus for making spring units for mattresses, cushions, and like spring-filled articles; and more specifically, to provide apparatus wherein a minimum of hand and assembly operations are required.

A further object of the invention is to provide for the making of spring units of the type defined in a continuous manner, the structures being suitably fabricated so as to be readily separable into individual units of proper size.

A still further object of the invention is to provide for the manufacture of spring units of the type defined wherein simultaneously with the assembly of the springs sheet-like elements, preferably of non-metallic fabric or fibrous material, such as sisal or the like, are applied to the springs to form the unit structures.

Another object of the invention is to provide improved and more economical means for securing the springs to the sheet-like elements such, for example, as sisal or the like. In accordance with one preferred embodiment of the invention common means is used for assembling the springs and securing the sisal pads in position, whereby to enable the elimination of other connecting means for the springs, minimizing the assembly operations required and reducing the over-all weight of the assembled structure.

Various other objects, advantages and features of the invention will appear from the following specification when taken in connection with the accompanying drawings, wherein a preferred embodiment of the invention is set forth for purposes of illustration.

In the drawings, wherein like reference numerals refer to like parts throughout:

Fig. 1 is a general assembly view, in perspective, of a machine constructed in accordance with and adapted to carry out the principles of the invention, certain of the parts being broken away to better illustrate the operation of the mechanisms;

Fig. 2 is a side view of the machine looking from the left as seen in Fig. 1;

Fig. 3 is a detail view illustrating a portion of the mechanism for feeding the springs through the machine, and taken substantially as indicated on the line 3—3 of Fig. 1;

Fig. 4 is a vertical sectional view through the machine, taken substantially as indicated on the line 4—4 of Fig. 1, and indicating one of the several duplicate spring assembling units of which the machine is composed;

Fig. 5 is a detail view of one of the loading platforms for receiving the springs from the supply hoppers or troughs, and taken as indicated on the line 5—5 of Fig. 1;

Figs. 6, 7, 8 and 9 are detail illustrative views, showing the several steps in the operation of the mechanisms at the spring and sisal assembly station;

Figs. 10, 11 and 12 are detail illustrative views on an enlarged scale showing the initial steps in the operation of the spring positioning and shuttle mechanisms;

Fig. 13 is a sectional view through the shuttle structure, taken as indicated on the line 13—13 of Fig. 12, and more particularly illustrating the operation of the stapling mechanism; and Fig. 14 is a perspective view of a portion of the completed spring unit as fabricated by the machine.

This application is a continuation-in-part of my copending application, Serial No. 396,106, filed May 31, 1941, and entitled "Method and apparatus for making mattresses."

*General machine structure and drive mechanism*

Referring more particularly to the drawings, and first to the general assembly view, Fig. 1, it will be seen that the machine comprises a main frame structure having side walls or frames 10 and 11 between which the various spring assembling units or structures are arranged. In the particular embodiment illustrated there are ten duplicate assembling units each of which, as will be later more particularly described, is operative to assemble and secure in position a longitudinally extending line or a series of springs, thus producing a composite spring unit structure having a width or length, as the case may be, of ten parallel spring lines. It is to be understood, however, that the number of parallel mechanisms thus provided is dependent solely upon the over-all length or width of the composite structure desired, and may be enlarged or decreased depending upon the requirements of any particular installation. In accordance with the principles of the invention the parallel lines or series of springs are connected together for a predetermined number, seven in the particular embodiment illustrated, a spacing being thereafter effected and the operation repeated. Accordingly, when the structure continuously formed by the machine is severed into units, individual completed units of seventy springs each will be formed. As stated, however, these figures are merely illustrative of one selected embodiment shown and may be varied both as to width and length, as required.

The side wall 10 carries a pair of upper brackets 12 and 13, and a pair of lower brackets 14 and 15, Fig. 2, within which upstanding rods 16 and 17 are vertically shiftable. The rods are connected at their upper ends by a cross head 18, and at a point intermediate their length by a cross head 19. Both of the cross heads 18 and 19 are permanently secured to the rods and move as a unit therewith. A similar structure is provided on the opposite side of the machine, in association with the side frame 11, the reciprocating rods corresponding to the rods 16 and 17 being indicated at 16a and 17a in Figs. 1 and 4, and the corresponding cross head at 18a.

A shaft 21, Figs. 1 and 2, is journaled in the side frames 10 and 11, said shaft having fixed thereto at opposite ends relatively large gears, one of which is indicated at 22 in Figs. 1 and 2. The gear 22 is pivotally connected to the lower end of a connecting rod 23 which rod is pivotally connected at its upper end to the cross head 19. It will be seen that the gear 22 acts in the nature of a crank, so that upon rotation thereof the associated connecting rod 23 operates to impart reciprocation to the cross head 19 and its connected rods 16 and 17. It will be understood that a connecting rod similar to the rod 23 is provided for the gear at the opposite side of the machine, a duplicate of the gear 22, whereby rotation of such gear serves to reciprocate the associated uprights or rods 16a and 17a.

The gears on shaft 21 are driven, respectively, from pinions fixed to the opposite ends of a drive shaft 25 extending across the machine, the shafts 21 and 25 thus being geared together at both of their ends to insure an equalized torque driving arrangement. The pinion engageable with the gear 22 is shown at 26 in Fig. 2. The shaft 25 is propelled by a pulley wheel 27, Fig. 1, secured thereto, driven from a belt 28 connected to an electric motor, line shaft or other suitable prime mover.

It will be seen that by the connections thus provided, when the machine is in operation, the rods 16 and 17, and the corresponding rods 16a and 17a at the opposite side of the machine, will be continuously vertically reciprocated.

*Spring-feeding-mechanism*

The springs which are to be assembled into the mattress or cushion units are fed to the machine from a series of supply hoppers or troughs 30, Figs. 1, 2 and 4, there being a separate trough for each of the ten parallel assembling units provided. The springs may be fed into the upper ends of these troughs in any desired manner, and the troughs are of such size with respect to the springs as to compel the springs to move therethrough in an orderly and alined manner. The springs, as indicated at 31 in Fig. 4, are of the usual conical coiled type conventionally provided in mattress and cushion structures. The springs are propelled through the troughs by gravity, automatically moving therethrough as the spring at the lower end of the trough is removed by means presently to be described.

At the lower end of each of the supply troughs a loading platform comprising a pair of plates 32 and 33 is provided, Figs. 1, 4 and 5. These plates are carried on a pair of shafts or rods 34 and 35 extending loosely through the plates and across the machine to be journaled at their ends in the side frame structures 10 and 11. For positioning each pair of plates, shafts 34 and 35 are provided along their lengths with sets of collars 36, Fig. 5, suitably secured to and positioned upon the shafts by means of set screws or the like. These collars through the action of compression springs 37 and associated collars 38 loosely mounted on the shafts normally operate to shift the plates relatively together, the movement being limited by collars 39 fixed to the shafts as in the case of the collars 36. When the parts are in their normal position, as shown in full lines in Fig. 5, the spacing and positioning of the plates 32 and 33 is such that they form a trough within which the conical spring received from the supply hopper 30 is adapted to lie with its axis horizontally disposed. At the same time the plates are yieldably mounted so as to permit the spring to be pulled downwardly between the plates, the plates under these conditions being shifted to their dotted line position, as shown in Fig. 5, against the action of the compression springs 37. It will be understood that the springs are caused to be properly received from the hoppers, and to lie between the plates in engagement with the plate carried positioning lugs 40, by the pressure of the following springs in the hoppers.

To effect the downward feeding of the springs supported between the plates 32 and 33, a pair of feeding chains 41 and 42, Figs. 2 and 4, are provided for each of the parallel mechanisms. These chains are driven by sprockets 43 and 44 fixed at intervals along the lengths of the shafts 34 and 35, and adapted to be driven thereby. To effect the driving of the shafts in timed relation with the other operating mechanisms of the machine, means is provided for periodically driving the shafts upon the upward movement of the cross heads 18 and 18a. More specifically, the cross heads 18 and 18a are connected by a cross bar 45 supporting a rack member 46. This rack member 46, Figs. 1 and 3, is in geared engagement with a gear 47 loosely mounted on the shaft 34, which gear carries a spring pressed pawl 48. This pawl cooperates with a ratchet 49 keyed or otherwise fixed to the shaft 34.

It will be seen that downward movement of the rack 46 resulting in counterclockwise rotation of the gear 47 merely causes the pawl 48 to move idly along the surface of the ratchet wheel. However, upward movement of the rack 46, resulting in clockwise rotation of the gear 47, causes the pawl 48 to propel the ratchet 49 and with it the shaft 34 a predetermined distance and in timed relation with the movement of the cross heads 18 and 18a.

As shown in Fig. 1, the end of the shaft 34 adjacent the frame 10 has a gear 51 secured thereto arranged to drive a pair of idler gears 52 and 53 which idler gears are in turn arranged to drive a gear 54 secured to the end of the shaft 35. By this means 35 shaft 35 and the chain sprockets 44 are driven counterclockwise as seen in Fig. 4, simultaneously with the clockwise rotation of the shaft 34 and its associated sprockets 43.

The chains 41 and 42 at their lower ends pass over a series of sprockets 55 and 56 mounted, respectively, along the length of shafts 57 and 58 extending across the machine and rotatably mounted in the end frames. Each of the chains is provided at intervals with projections or lugs 60 arranged in suitable spaced relation, the lugs 60 cooperating on the two chains to engage the opposite lower ends of the springs held between the plates 32 and 33 to effect the downward feeding thereof, as best shown in Fig. 4. When the spring coils 31 lie between the plates 32 and 33, as shown in full lines in Fig. 5, and in Fig. 4, they are so held as to be engageable by the lugs 60 of the chains, as the chains are operated upon rotation of the shafts 34 and 35. By this means it will be seen that periodically during the operation of the machine, and in timed relation with the movement of the cross heads 18 and 18a, the spring coils 31 are gripped between the feeding chains 41 and 42, and fed downwardly thereby as shown in Fig. 4.

As also shown in Fig. 4, at one point along the length of the chains, as indicated at 61, no lugs or projections are provided so that a spacing in the feeding of the springs will occur. The purpose of this will be later described.

Spring positioning mechanism

As the spring coils 31 are delivered from the lower ends of the feeding chains 41 and 42, they are delivered to mechanism which positions the coils for engagement with a shuttle structure, which shuttle structure then delivers the springs to the stapling mechanism by which the springs are secured to and between the sisal pads.

More specifically, referring to Figs. 1 and 4, there is provided on the machine at a position substantially below the lower ends of the chains 41 and 42 a platform or subframe as indicated at 64. This platform extends substantially across the machine, between the side frames 10 and 11 and is horizontally shiftable upon a pair of guide rods 65 and 66, and a track structure 67. To effect the shifting of the platform, there is provided a pair of extending racks 68 and 69 engageable, respectively, with pinions 70 and 71 secured to a shaft 72 extending across the machine and journaled in the end frames. As best shown in Fig. 2, this shaft is provided at its end adjacent the frame 10 with a pinion 73, the pinion being fixed to the shaft and being adapted to be driven from a gear 74 which is in turn arranged to be driven from the driving gear 75 of a reversible electric motor as indicated at 76. It will be seen that as the motor 76 is operated in one direction or the other, the platform or subframe 64 will be correspondingly shifted to the right or to the left as seen in Fig. 4 through its range of travel. In Fig. 4 the platform is shown at the end of its travel to the right.

Means is provided for controlling the operation of the motor 76 in timed relation with the movement of the rods 16 and 17. Rod 16 is provided with a pair of collars 78 and 79 fixed thereto, Fig. 2, and rod 17 is similarly provided with a pair of collars 80 and 81 fixed thereto, these collars serving to control the movements of a cross head or cross bar 82 loosely journaled on the rods 16 and 17 for slidable movement with respect thereto under control of the collars, for a purpose later to be described. One of these collars, viz., the collar 80 carries a switch operating arm 83 adapted to actuate a pair of control switches 84 and 85, Fig. 2, arranged along its path of travel. Another pair of control switches 86 and 87, Fig. 4, acting in the nature of limit switches, are provided adapted to be actuated by a screw 88 carried on the shiftable platform or slide 64. The arrangement is such that when the rod 17 has almost reached its uppermost position, as shown in Fig. 2, the arm or bracket 83 operates the switch 84 thus initiating operation of the electric motor 76, by suitable circuit connections, causing the slide 64 to shift to the left or forwardly from its normal retracted position as shown in Fig. 4. When the slide reaches the end of its travel the screw 88 operates the limit switch 86 to deenergize the motor and stop the slide. Upon continued operation of the machine, and after the rod 17 has moved downwardly through a major portion of its stroke of travel, the bracket 83 operates the control switch 85. This energizes the motor 76 in reverse to retract the slide 64, to the right as seen in Fig. 4, and as the slide reaches its retracted position the screw 88 operates the limit switch 87 to deenergize the motor and stop the slide. It will thus be seen that the slide or subframe 64 is advanced and retracted in timed relation with the movement of the rods 16 and 17.

The shifting of the slide 64 is employed for feeding the spring coils as they leave the feeding chains 41 and 42, into position to be gripped by the shuttle structures of the machine, there being one shuttle as indicated at 90, Fig. 4, for each of the ten parallel assembling units. The shuttles are carried by the cross bar or beam 45 and provided with gripping or operating arms 91 and 92 engageable with the spring coils.

More specifically, as the spring coils 31 are ejected from the lower ends of the feeding chains 41 and 42, they drop into horizontal trough structures provided by resilient plates 94 and 95, the structure of which will be best understood by reference to Figs. 4 and 10. These plates are provided with resilient angularly disposed portions 96 and 97 forming a trough within which the springs are supported with their axes horizontally disposed. The plates are supported upon a frame bar 98 extending across the machine.

The slide 64 carries a series of brackets 99, Figs. 1 and 4, one for each pair of plates 94 and 95, within which plungers as indicated at 100 are reciprocably mounted. Each of these plungers is provided on its forward end with a pushing head 101 shaped to engage the end of the spring while at the same time passing freely between the resilient portions 96 and 97 of the trough plates. A compression spring as indicated at 102, Fig. 4, for each head provides a resilient mounting while normally holding the head in the position indicated in Fig. 4, with the adjustable collar 103 secured to the plunger 100 in abutting engagement with the bracket 99. In operation as the slide 64 is advanced to the left as shown in Fig. 4, the several pushing heads 101 engage the spring coils which have been ejected from the feeding chains, projecting them to the left along the trough forming plates 94 and 95.

To limit the movement of the springs a series of abutment heads 105, Fig. 4, is provided, one for each of the parallel banks of the machine. These heads are shaped similarly to the heads 101 to engage the ends of the spring coils while providing clearance with the trough structures 96 and 97. This shaping will be best understood by reference to Fig. 10 wherein the end of the head 105 is shown. Each of the heads 105 is carried on the forward end of a plunger sleeve 106 shiftably mounted in a bracket 107. A compression spring 108 normally holds the head 105 in its extended or advanced position as shown in Fig. 4. The brackets 107 are carried upon a stationary frame bar 109 extending across the machine. The abutment heads 105 limit the movement of the spring coils as they are advanced by the pushing heads 101.

As the spring coils 31 are ejected from the feeding chains into the trough plates 94 and 95, while they automatically assume a horizontal position therein, the end tie connections, as indicated at 112 in Fig. 10, with which such springs are conventionally provided, may be in any radial position. In order that the shuttle and stapling structures shall be properly operable, it is desirable that the spring coils be rotatably indexed to bring these tie connections into predetermined radial position.

An indexing head is provided for each of the parallel banks of the machine, for effecting these rotatable indexing operations. More specifically, referring to Fig. 4, there is provided in association with each of the abutment heads 105 an indexing cone as indicated at 113 mounted on the forward end of a shaft 114 carried by and rotatably journaled in a bracket member 115. The brackets 115 for the several parallel banks of the machine are all mounted upon a subframe or slide 116 generally similar in character to the slide 64 previously described.

Thus referring to Figs. 2 and 4, this slide may be provided with a pair of racks 117 operable by pinions 118 secured to a shaft 119 extending across the machine, similar to the shaft 72, Fig. 1, previously described. As shown in Fig. 2, the shaft 119 may be conveniently operated from a reversible electric motor 120 by means of gearing connections 121, 122 and 123. A pair of control switches 124 and 125, Fig. 2, adapted to be operated by an arm or bracket 126 secured to the collar 78, and a pair of limit switches 127 and 128, Fig. 4, adapted for operation by a screw 129 carried by the slide 116 are provided for controlling the slide movements.

In operation, the positioning of the control switch 124 is such that it is operated to energize motor 120 through suitable circuit connections to initiate the forward or advance movement of the slide 116, to the right as seen in Fig. 4, shortly after operation of the control switch 84 for the slide 64, and substantially as the rods 16 and 17 reach their uppermost position. The forward or advance movement of the slide 116 is limited by the engagement of the slide screw 129 with the limit switch 128 which deenergizes the motor 120. As the rod 16 begins its downward movement, and after the spring coils have been indexed and just prior to the engagement of the coils by the shuttle arms 91 and 92, as will be later described, the bracket 126 operates the control switch 125 to initiate reverse operation of the motor 120. The slide 116 is thus retracted until the screw 129 engages the limit switch 127, thus deenergizing the motor and stopping the slide in its retracted position as shown in Fig. 4.

Each of the shafts 114, Fig. 4, is provided on its rear end with a bevel gear 130 adapted to be operated by a cooperating gear 131 fixed to a shaft 132, Fig. 1, mounted on the slide 116 and extending across the machine. At its end adjacent the side frame 11, the slide 116 carries a constantly operating electric motor 133, Fig. 4, which by means of the gearing 134 is adapted to operate the shaft 132. It will thus be seen that the constantly operating motor 133, the shaft 132, and the several bevel gears 131, all of which are carried by the slide 116, serve as means for maintaining the shafts 114 for the several parallel banks in constant rotation. As the slide 116 is advanced, the indexing cones 113 engage the convolutions of the spring coils, as indicated in Fig. 6, whereby to effect their indexing rotation.

In order to arrest the rotation of the springs in proper indexed position, each of the indexing heads in addition to the rotating cone 113 also includes a stationary indexing pin 136, Figs. 1, 4 and 10 carried by the bracket 115, operable to engage the adjacent tie connection 112 to arrest the rotation of the spring in a predetermined radial position. The action will be best understood by a comparison of Figs. 10 and 11. It will be seen that as the spring coil 31 is engaged by the rotating cone and rotated in a clockwise direction as seen in Figs. 10 and 11, the tie connection 112 regardless of its radial disposition will be brought into engagement with the indexing pin 136 as shown in Fig. 11, the spring thus being radially indexed in the proper position.

*Shuttle structure and spring assembling mechanism*

Upon downward movement of the rods 16 and 17, and immediately after withdrawal of the indexing cones 113 and the indexing pins 136, the arms 91 and 92 of the shuttles are brought into engagement with the springs to effect the downward feeding and positioning thereof in proper position for operation of the stapling mechanisms. The manner in which the shuttle arms grip the springs will be best understood from Figs. 12 and 13, and also from the sequential illustrative views, Figs. 6 to 9 inclusive.

The shuttle arms 91 and 92 are provided with pointed ends 140, as indicated in Figs. 12 and 13. The shuttle arms are also provided with spring coil positioning shoulders or abutment portions 141 of curved shape conforming to the curvature of the spring end convolutions, and with arcuate recesses or depressions 142 cooperable with the stapling mechanisms in a manner presently to be described. In operation, the pushing heads 101, when in advanced position, and the abutment heads 105, hold the spring coils 31 therebetween, as shown in Figs. 6 and 7, so that as the shuttle arms descend they engage and grip the coil convolutions as illustrated in Figs. 12 and 13. Preferably the shuttle arms are so spaced as to impart a slight elongation or tension to the spring coils as they are gripped, whereby to firmly hold them in position. The resilient mounting of the pushing and abutment heads 101 and 105 permit these heads to separate slightly against the compression of springs 102 and 108 to accommodate the downward movement of the shuttle arms. As the arms continue to descend, as shown in Fig. 8, the positioning shoulders 141 thereof are brought into engagement with the upper portions of the coil convolutions after which upon continued downward movement of the shuttle arms the impaled spring coil moves downwardly as a unit therewith. As the shoulders 141 of the arms force the spring downwardly, the resilient portions 96 and 97 of the trough plates 94 and 95 yield to accommodate such movement, see Fig. 12. As best shown in Figs. 12 and 13, the arrangement is such that when the upper portions of the spring coil are in engagement with the shoulders 141, the lower portions thereof are alined with the arcuate recesses 142 of the shuttle arms.

Two supply rolls as indicated at 145 and 146, Fig. 1, are provided for continuous sheets of sisal or the like, these rolls being mounted upon shafts 147 and 148 carried by suitable support brackets. Adjustable friction mechanisms, as indicated at 149, may be associated with the shafts 147 and 148 for imparting predetermined frictional resistance to the withdrawal of the sisal sheets from the rolls. The two sisal sheets indicated, respectively, by the numerals 150 and 151 are adapted to pass over idler rolls 152 and 153, Fig. 4, and thence downwardly in parallel spaced relation to receive the spring coils therebetween.

The cross head or bar 82, Fig. 2, which is loosely mounted on the rods 16 and 17, rotatably carries a pair of shafts 155 and 156 extending across the machine, these shafts being journaled at their opposite ends in a similar cross bar 82a loosely mounted on the rods 16a and 17a. It will be understood that the rods at both ends of the machine carry collars such as indicated at 78, 79, 80 and 81, Fig. 2, for controlling the shifting of the two shiftably mounted cross bars 82 and 82a, whereby to maintain the shafts 155 and 156 horizontally disposed at all times. Collars 79a and 81a, corresponding, respectively, to collars 79 and 81, are shown in Fig. 4. At their ends adjacent the side frame 11, shafts 155 and 156 have fixed thereto a pair of arms 157 and 158, Fig. 4, these arms being adapted to be brought into engagement with a surface 159 of the frame 11 when the shiftable cross heads 82 and 82a with their shafts 155 and 156 are moved to their lowermost position. This engagement effects an upward pivotal movement of the arms 157 and 158 resulting in a counterclockwise movement of the shaft 155 and a corresponding clockwise movement of the shaft 156. A chain 160 is connected between the ends of the arms 157 and 158 and the frame portion 159 to effect a downward pulling of the arms as the shiftable cross heads 82 and 82a and the shafts 155 and 156 are moved to their uppermost position.

Shafts 155 and 156 also have keyed thereto at intervals along their length a series of hooks 161 and 162, Figs. 1, 2 and 4, the ends of which are adapted to pierce and grip the sisal sheets as the shaft 155 is pivoted clockwise and the shaft 156 pivoted counterclockwise. It will be seen that as the cross heads 82 and 82a are moved to their uppermost position, the chain 160 operates the arms 157 and 158 to bring the hooks into gripping engagement with the sisal, whereas as the cross heads are moved to their lowermost position, the arms 157 and 158 engage the frame portion 159 to disengage the hooks.

A plurality of stapling devices generally indicated by the numerals 165 and 166, Figs. 1 and 4, are provided, there being two opposed stapling devices for each of the ten machine banks. These stapling devices may be of any suitable conventional structure and as illustrated comprise stapling heads 167 projecting into juxtaposition to the sisal pads and within which the stapling mechanism as indicated at 168, Fig. 4, is operable. The stapling devices may be mounted upon the machine, upon a pair of cross frame members 169 and 170, Fig. 4.

Constantly operating drive motors 172 and 173, Figs. 1 and 2, are provided for driving the two sets of stapling devices. The motor 173 is arranged through gearing connections 174 to drive a shaft 175 extending across the machine. This shaft is provided with a series of cam mechanisms 176, Figs. 1 and 4, for driving the respective stapling devices 166. Similarly the drive motor 172 is arranged by means of gearing connections 177, Fig. 2, to effect the operation of a drive shaft 178 extending across the machine and provided with spaced cam mechanisms 179, Fig. 4, for driving the respective stapling devices 165.

As is conventional in stapling devices of the character described, they are provided with single operation clutch mechanisms as indicated at 180 and 181, Fig. 4. These clutches are adapted to be operated by the shiftable cross head 82, Fig. 2, in timed relation to the movements thereof. More specifically, the cross head 82 is provided with a pair of oppositely extending projections as indicated at 182 and 183. The projection 182, when the cross head 82 reaches its lower limit of travel, is adapted to operate a lever 184 connected to a shaft 185 extending across the machine. This shaft is provided at spaced intervals with a series of arms 186, one for each of the ten stapling mechanisms, which arms are connected, respectively, to links 187 extending upwardly and connected, respectively, to the several clutches 181. Similarly, the projection 183 is adapted to operate a lever 190, Fig. 2, connected to a shaft 191 extending across the machine on the opposite side of the cross head 82, this shaft being provided with spaced arms 192 connected, respectively, to links 193 arranged for operation of the respective clutch mechanisms 180 of the stapling devices 165. It will be seen that by means of the structures thus provided, the power cam mechanisms 176 and 179 of the two sets of stapling devices are constantly driven by the motors 173 and 172. When the shiftable cross head 82 reaches its lowermost extent of travel, the levers 184 and 190 are operated causing actuation of the clutches 181 and 180 to cause the cam driving mechanisms to impart a single cycle of operation to the stapling devices after which the clutches are automatically disconnected, as is conventional in stapling devices of this character. The stapling wire 195 is supplied to the stapling devices 165 from a series of supply rolls 196, Fig. 4, and to the stapling devices 166 from a series of supply rolls 197, Figs. 1 and 4. The wire is drawn from the supply rolls 196 over a series of idler rolls 198, and from the supply rolls 197 over a series of idler rolls 199 automatically by the operation of the stapling devices, as will be understood.

In operation, as the rods 16 and 17 approach their uppermost position, the collars 79 and 81 thereon engage the lower surface of the slidable cross head 82 to effect the upward movement of the cross head with the rods. Similarly and simultaneously therewith the collars 79a and 81a of the rods 16a and 17a effect the upward shifting of the slidable cross head 82a. This effects an upward shifting of the shafts 155 and 156 so that as the slidable cross heads reach their uppermost position the chain 160 operates to pivot the hooks 161 and 162 into gripping engagement with the sisal pads, as shown in Fig. 4. As the rods 16, 17 and 16a, 17a begin their downward movement, the slidable cross heads 82 and 82a do not initially move downward therewith, due to the slidable connections provided between the rods and the cross heads, and further due to the frictional resistance to movement of the sisal pads, holding the hooks 161 and 162 and the associated slidable cross heads in uppermost position. However, simultaneously as the shuttle arms 91 and 92 have moved downwardly a sufficient distance to cause the impaled spring to engage the shoulders 141 on the arms, the collars 78 and 80, Fig. 2, on the rods 16 and 17, and the corresponding collars on the rods 16a and 17a engage the upper surfaces of the slidable cross heads 82 and 82a causing the downward shifting thereof with the rods. This time in the cycle of operations is indicated in Fig. 8. Accordingly, on continued downward movement of the shuttle arms, the hooks 161 and 162, and resultingly the sisal pads and the previously assembled spring structures move downwardly as a unit therewith until the structures have reached their lowermost position, as shown in Figs. 9 and 13, wherein the juxtaposed portions of the adjacent springs coils to be assembled are in alinement with the stapling heads 167. The spacing between the shoulders 141 and the arcuate recesses 142 of the shuttle arms is such that as the upper portion of the newly presented spring, as indicated at 31a in Fig. 13, is engaged by the shoulders 141, the lower portion of this spring is brought into juxtaposition with the upper portion of the previously assembled spring, as indicated at 31b, at the arcuate recesses 142. During the downward movement of the shiftable cross heads, the two juxtaposed springs move downwardly as a unit, ultimately reaching the position of Fig. 9. At this position the projections 182 and 183 of the slidable cross head 82 effect the operation of the stapling devices, and the levers 157 and 158 are engaged by the frame bracket 159 to effect disengagement of the hooks 161 and 162. The action of the stapling heads is specifically indicated in Fig. 13. It will be seen that the staples as shown at 201 and 202 are projected by the stapling heads through the sisal pads around the juxtaposed portions of the spring coils, being clinched by the arcuate recesses 142 of the shuttle arms.

Upon the upward movement of the rods 16, 17 and 16a, 17a, the slidable cross heads 82 and 82a will not shift upwardly until engaged by the rod collars 79, 81 and 79a, 81a, after the rods have shifted upwardly a substantial distance of their travel.

*Severing means*

In accordance with the principles of the invention, as hereinbefore pointed out, the feeding of springs is omitted at predetermined spaced intervals due to the absence of feeding lugs on the feeding chains 41 and 42 at the station indicated at 61. Accordingly at predetermined spaced intervals there will be a spacing between the connected spring coils, for example, as indicated at 205 in Fig. 4. The sisal pads may be cut at such points thereby effecting the production of individual spring units. Such cutting or severing means is generally indicated by the numeral 206 in Fig. 4, and may, for example, comprise a knife 207 adapted to sever the sisal pads across their widths, the knife being operated by a reciprocating vibratory support 208. It is to be understood that any suitable severing means may be provided, and the particular details thereof form no part of the present invention.

In Fig. 14 a portion of a completed spring unit is illustrated in perspective, the line of severance being indicated at 210.

*Operation*

The operation of the various mechanisms has been heretofore set forth, but may be further summarized as follows:

During operation of the machine the rods 16, 17 and 16a, 17a are continuously reciprocated through their driving connections from the main power belt 28, Fig. 1. During the upward movement of the rods the rack 46 and pawl and ratchet mechanism 48, 49, Figs. 1 and 3, operate to effect rotation of the shafts 34 and 35 thereby effecting the operation of the feeding chains 41 and 42. Prior to the time the rods reach their uppermost position, each set of feeding chains has operated sufficiently to eject a spring coil 31 into position between the trough plates 94, 95, and also to withdraw a new spring from between the plates 32 and 33 to which the springs are continuously supplied from the supply hoppers or chutes 30.

As the rods 16, 17 and 16a, 17a are approaching their uppermost position, the switch bracket 83, Fig. 2, operates the control switch 84 to advance the slide 64, thereby causing the pushing heads 101 to be advanced, to the left as seen in Fig. 4, thereby advancing the spring coils ejected from the feeding chains into engagement with the abutment heads 105 and positioned thereby as shown in Figs. 6 and 7. Just as the rods 16, 17 and 16a, 17a reach their uppermost position, and after the springs have been advanced by the pushing heads, the switch bracket 126, Fig. 2, operates the control switch 124 to advance the slide 116 carrying the indexing heads. These heads comprising the constantly rotating friction cones 113 and the fixed indexing pins 136 effect the rotational indexing of the springs for proper engagement by the shuttle arms.

As the rods 16, 17 and 16a, 17a begin their downward movement, the bracket 126 operates the control switch 125 to withdraw the slide 116 and the indexing heads from the position shown in Fig. 6 to the position of Fig. 7. Immediately thereafter the spring coils are engaged by and impaled upon the shuttle arms 91 and 92, and as the springs reach the arm shoulders 141 they are forced downwardly with the arms between the plate portions 96 and 97, Fig. 10. Just as the newly presented springs have been shifted downwardly sufficiently to come into juxtaposition with the previously assembled spring, as shown in Fig. 8, the slidable cross heads 82 and 82a are caused to move downwardly with the rods 16, 17 and 16a, 17a by the engagement of the operating collars such as indicated at 78 and 80, Fig. 2. This causes a downward movement of the hooks 161 and 162, and the sisal pads therewith, these hooks having been engaged with the sisal, through the action of the chain 160, as the slidable cross heads 82 and 82a were propelled to their uppermost position.

The sisal pads, previously assembled spring coils, and newly presented spring coils now move downwardly as a unit until the parts reach the position of Fig. 9, wherein the contacting portions of the spring coils to be assembled are in alinement with the stapling heads 167. Also during this downward movement the switch bracket 83, Fig. 2, operates the control switch 85 to withdraw the pushing heads 101 so that they may subsequently repeat their cycle of operation.

As the rods 16, 17 and 16a, 17a reach their lowermost position, as shown in Fig. 9, the projections 182 and 183, Fig. 2, of the slidable cross head 82 effect the operation of the stapling devices in a manner illustrated in Fig. 13 to effect a stapling of the spring coils together and to the sisal pads. Also, as the parts reach this position the frame bracket 159 operates the levers 157 and 158 to withdraw the hooks 161 and 162 from the sisal pads. As the rods 16, 17 and 16a, 17a move upwardly, the slidable cross heads 82 and 82a are not shifted until engaged by the collars 79, 81 and 79a, 81a.

At predetermined spaced intervals, the feeding chains 41 and 42 omit the feeding of a spring coil so that at predetermined spaced intervals in the assembled structures no spring coils will be present as indicated at 205 in Fig. 4. It is at this point that the cutting or severing means 206 is operative to sever the sisal pads.

It will be seen that in accordance with the invention, apparatus is provided for making spring units for mattresses, cushions, or the like economically, continuously, and automatically. The structures are so fabricated that they may be readily separated into complete spring units to which the conventional cotton padding and covering or ticking may be applied to form a mattress or cushion. By varying the width of the machine and the spacing of the non-feeding stations 61 of the feeding chains, spring units of any desired size may readily be formed. The sheet material 150 and 151 may take any suitable form, but a non-metallic fibrous material such as sisal or the like, in pad form, is preferred. The springs, if desired, may be secured in position solely by being secured to the sheet material but preferably, in the structures provided, the spring coils are connected together simultaneously with the securing of the springs to the sisal pads. Specifically common securing means or staples are employed which both connect the springs together and secure the sisal pads to the springs. A spring unit of strength but of minimum weight is provided.

It is obvious that various changes may be made in the specific embodiment set forth for purposes of illustration without departing from the spirit of the invention. Accordingly, the invention is not to be limited to the specific embodiment shown and described, but only as indicated in the following claims.

The invention is hereby claimed as follows:

1. Apparatus for making spring units for mattresses, cushions, or the like which comprises means for progressively feeding a series of springs in alinement, means for progressively applying elongated sheet material to the alined springs, stapling means for sequentially stapling the springs to the sheet material, and means for severing the sheet material at predetermined spaced points whereby to provide individual spring unit structures.

2. Apparatus for making spring units for mattresses, cushions, or the like which comprises feeding means for progressively feeding a series of springs in alinement, cyclically operable control means for controlling the operation of the feeding means to omit the feeding of the springs at predetermined spaced points in said series, means for progressively applying elongated sheet material to the alined springs, and means for sequentially stapling the springs to the sheet material and to each other in predetermined spacing whereby to provide the spring unit structures.

3. Apparatus for making spring units for mattresses, cushions, or the like which comprises means for progressively feeding a series of springs in alinement, means for progressively applying an elongated sheet of non-metallic fibrous material to the alined springs, and means for sequentially securing the springs to the sheet material and to each other whereby to provide the spring unit structures.

4. Apparatus for making spring units for mattresses, cushions, or the like which comprises means for progressively feeding a series of coil springs in alined sequence with their individual axes perpendicular to the axis of alinement, means for progressively applying an elongated sheet of non-metallic fibrous material to the ends of the alined springs, and stapling mechanism for sequentially projecting staples through the sheet material and around the abutting ends of adjacent springs whereby to secure the springs to each other and to the sheet material to thereby provide the spring unit structures.

5. Apparatus for making spring units for mattresses, cushions, or the like which comprises means for progressively feeding a plurality of parallel rows of coil springs in alined sequence with their individual axes perpendicular to the axes of the rows, means for feeding a pair of elongated sheets of material into engagement with the opposite ends of the alined springs, and means for sequentially securing the ends of the springs to the abutting sheet material whereby to provide spring unit structures composed of a plurality of rows of springs arranged between said sheets.

6. Apparatus for making spring units for mattresses, cushions, or the like which comprises means for progressively feeding a plurality of parallel rows of coil springs in alined sequence with their individual axes perpendicular to the axes of the rows, means for feeding a pair of elongated sheets of non-metallic fibrous material into engagement with the opposite ends of the alined springs, and means for sequentially securing the ends of the springs to each other and to the abutting sheet material whereby to provide spring unit structures composed of a plurality of rows of springs arranged between said sheets.

7. Apparatus for making spring units for mattresses, cushions, or the like which comprises means for guiding a pair of elongated sheets of material in predetermined spaced relation, cyclically operable means for inserting coil springs in alined sequence between said sheets whereby to provide a row of said springs between the sheets with their individual axes perpendicular to the planes of the sheets, means associated with the inserting means for rotatably indexing the springs to a predetermined position, and means for securing the springs to the sheet material in predetermined spacing whereby to provide the spring unit structures.

8. Apparatus for making spring units for mattresses, cushions, or the like which comprises means for guiding a pair of elongated sheets of material in predetermined spaced relation, a cyclically operable reciprocating member for inserting coil springs in alined sequence between said sheets whereby to provide a row of said springs between the sheets with their individual axes perpendicular to the planes of the sheets, means for feeding springs to said reciprocable member, and means operable in timed relation with the reciprocating member for securing the springs to the sheet material in predetermined spacing whereby to provide the spring unit structures.

9. In apparatus for progressively and automatically producing spring units, means for delivering continuous strips of padding for the top and bottom of the units, a plurality of lines of feeding devices for springs, a shuttle for each line of springs, said shuttles picking up said springs and carrying them into position between the strips of padding, and means for projecting the prongs of staples through the padding and around the end coils of adjacent springs and thereby connecting the springs to the paddings.

10. In apparatus for progressively and automatically producing spring units, means for delivering continuous strips of padding for the top and bottom of the units, a plurality of lines of feeding devices for springs, a shuttle for each line of springs, said shuttles picking up said springs and carrying them into position between the strips of padding, a continuously reciprocating means for actuating said shuttles, means operating during a part only of the stroke of said reciprocating means for advancing the previously completed portions of the spring units a predetermined extent, and stapling means operating during the idle period of said advancing means for advancing staples for joining the springs to each other and to the padding.

11. Apparatus for making spring units for mattresses, cushions, or the like which comprises means for guiding a pair of elongated sheets of non-metallic fibrous material in predetermined spaced relation, a plurality of cyclically operable members for inserting coil springs into a plurality of rows between said sheets whereby to provide parallel rows of springs between the sheets with the individual spring axes perpendicular to the planes of the sheets, and stapling means for projecting staples through the sheets and around the juxtaposed ends of adjacent springs in said rows whereby to secure the springs together and to the sheets to provide the spring unit structures.

12. Apparatus for making spring units for mattresses, cushions, or the like which comprises means for feeding a pair of elongated sheets of non-metallic fibrous material in predetermined spaced relation, a cyclically operable member for inserting coil springs in alined sequence between said sheets whereby to provide a row of springs between the sheets with their individual axes perpendicular to the planes of the sheets, means for feeding springs to said member, stapling means for projecting staples through the sheets and around the juxtaposed ends of the springs whereby to secure the springs to the sheets and to each other, and means for feeding the sheets and the springs as a unit to the stapling means.

13. Apparatus for making spring units for mattresses, cushions, or the like which comprises means for guiding a pair of elongated sheets of non-metallic fibrous material in predetermined spaced relation, feeding means for sequentially feeding coil springs into a position juxtaposed to said sheets, means for rotatably indexing the springs to a predetermined angular position, a reciprocable shuttle for sequentially engaging the indexed springs and projecting them in alined sequence between the sheets with the individual spring axes perpendicular to the planes of the sheets, and stapling mechanism arranged adjacent the outside surfaces of the sheets for projecting staples through the sheets and around the ends of adjacent springs whereby to secure the springs together and to the sheets.

14. Apparatus for making spring units for mattresses, cushions, or the like comprising a supply source for springs, a securing station, feeding means for successively feeding springs from the supply source to the securing station in predetermined sequential relation, means at the securing station for holding the springs in predetermined position and for guiding the springs after securing from said station, securing means operable at the securing station for stapling the springs to each other to form the springs into an alined series, and control means for controlling the operation of the securing means in predetermined timed relation with the operation of the feeding means.

15. Apparatus for making spring units for mattresses, cushions, or the like comprising a supply source for coil springs, a securing station, feeding means for feeding springs from the supply source to the securing station in predetermined sequential relation, indexing means associated with the feeding means for rotatably indexing the springs into predetermined angular position, means at the securing station for holding the springs in predetermined position and for guiding the springs after securing from said station, securing means operable at the securing station for securing the springs in predetermined alignment to form the springs into an alined series, and control means for controlling the operation of the securing means in predetermined timed relation with the operation of the feeding means.

16. Apparatus for making spring units for mattresses, cushions, or the like comprising a supply source for coil springs, a securing station, feeding means for feeding springs from the supply source to the securing station in predetermined sequential relation, indexing means associated with the feeding means for rotatably indexing the springs into predetermined angular position, said indexing means comprising a rotatable member engageable with a spring for rotating it on its axis, and an abutment for arresting rotation of the spring in the desired angular position, means at the securing station for holding the springs in predetermined position and for guiding the springs after securing from said station, securing means operable at the securing station for securing the springs in predetermined alignment to form the springs into an alined series, and control means for controlling the operation of the securing means in predetermined timed relation with the operation of the feeding means.

17. Apparatus for making spring units for mattresses, cushions, or the like comprising a supply source for springs, a securing station, feeding means for successively feeding springs from the supply source to the securing station in predetermined sequential relation, cyclically operable control means for controlling the operation of the feeding means to omit the feeding of the springs at predetermined intervals, means at the securing station for holding the springs in predetermined position and for guiding the springs after securing from said station, securing means operable at the securing station for stapling the springs together to form them into an alined series, and control means for controlling the operation of the securing means in predetermined timed relation with the operation of the feeding means.

18. Apparatus for making spring units for mattresses, cushions, or the like comprising a supply source for coil springs, a securing station, feeding means for successively feeding springs from the supply source to the securing station in predetermined sequential relation, said feeding means comprising an inclined trough along which the springs are adapted to be propelled in end to end relationship and a pair of feeding bands adapted to grip opposite spring end portions for receiving the springs from the trough, means at the securing station for holding the springs in predetermined position and for guiding the springs after securing from said station, securing means operable at the securing station for securing the springs relative to each other to form the springs into a fixed alined series, and control means for controlling the operation of the securing means in predetermined timed relation with the operation of the feeding means.

19. Apparatus for making spring units for mattresses, cushions, or the like comprising a supply source for coil springs, a securing station, feeding means for feeding springs from the supply source to the securing station in predetermined sequential relation, means at the securing station for holding the springs in predetermined position and for guiding the springs after securing from said station, securing means operable at the securing station for securing the springs together to form them into an alined series, said securing means comprising a staple projecting member adapted to project a staple around the end coils of adjacent springs to connect them together, and an anvil member adapted to be inserted into the spring coils to effect the crimping of the staple, and control means for controlling the operation of the securing means in predetermined timed relation with the operation of the feeding means.

20. Apparatus for making spring units for mattresses, cushions, or the like comprising a supply source for springs, a securing station, feeding means for successively feeding springs from the supply source to the securing station in predetermined sequential relation, feeding means for feeding an elongated strip of sheet material to the securing station, securing means operable at the securing station for stapling the springs to the sheet material and to each other into an alined series, and control means for controlling the operation of the securing means in predetermined timed relation with the operation of the feeding means.

21. Apparatus for making spring units for mattresses, cushions, or the like comprising a supply source for springs, a securing station, feeding means for successively feeding springs in a plurality of alined series from the supply source to the securing station in predetermined sequential relation, said feeding means comprising mechanisms operable to simultaneously propel corresponding springs in each of said alined series, means at the securing station for holding the springs in predetermined position and for guiding the springs after securing from said station, securing means operable at the securing station for securing the springs to each other to form the springs into fixed alinement, and control means for controlling the operation of the securing means in predetermined timed relation with the operation of the feeding means.

22. Apparatus for making spring units for mattresses, cushions, or the like which comprises means for progressively feeding a plurality of series of springs in alinement, means for progressively applying elongated non-metallic sheet material to said plurality of series of springs, said sheet material having a width at least as great as the width of said plurality of alined spring series, and means for stapling the springs to the sheet material and to each other, said securing means being simultaneously operable on the several spring series and sequentially operable within each spring series.

23. Apparatus for making spring units for mattresses, cushions, or the like comprising a supply source for coil springs, a securing station, indexing means for rotatably indexing the springs into predetermined angular position, feeding means comprising a pair of reciprocable anvil members adapted to feed the springs successively from the indexing means to the securing station, said anvil members being adapted to project into the coils of the springs, means at the securing station for holding the springs in predetermined position and for guiding the springs after securing from said station, stapling mechanism at the securing station arranged to project staples around the spring coils and into engagement with said anvil members to secure the springs, and means for controlling the operation of the indexing means, the anvil members and the stapling mechanisms in predetermined timed relation FREDERICK G. HODGES, Jr.